United States Patent [19]

Schwörer

[11] 4,224,773
[45] Sep. 30, 1980

[54] LARGE AREA WALL ELEMENT OF LIGHTWEIGHT SANDWICH DESIGN FOR PREFABRICATED BUILDINGS

[75] Inventor: Hans Schwörer, Sigmaringen, Fed. Rep. of Germany

[73] Assignee: Hans Schworer KG, Sigmaringen, Fed. Rep. of Germany

[21] Appl. No.: 917,697

[22] Filed: Jun. 21, 1978

[30] Foreign Application Priority Data

Jun. 30, 1977 [DE] Fed. Rep. of Germany ....... 2729474
Dec. 9, 1977 [DE] Fed. Rep. of Germany ....... 2754843

[51] Int. Cl.³ .............................................. B44F 7/00
[52] U.S. Cl. ................................... 52/315; 52/309.8; 52/389; 52/404
[58] Field of Search ............. 52/314, 315, 316, 309.8, 52/268, 269, 309.5, 389, 408, 404, 388, DIG. 7

[56] References Cited

U.S. PATENT DOCUMENTS

| | | | |
|---|---|---|---|
| 1,867,897 | 7/1932 | Stanbrough | 52/388 |
| 3,077,059 | 2/1963 | Stout | 52/388 |
| 3,150,032 | 9/1964 | Rubenstein | 52/DIG. 7 |
| 3,362,119 | 1/1968 | Murphy | 52/389 X |
| 3,397,498 | 8/1968 | Murphy | 52/389 X |
| 3,521,418 | 7/1970 | Bartoloni | 52/389 X |
| 3,646,180 | 2/1972 | Winnick | 52/388 X |
| 3,649,424 | 3/1972 | Rhiando | 52/315 X |
| 3,817,012 | 6/1974 | Wack et al. | 52/389 X |
| 3,868,801 | 3/1975 | Weiner | 52/315 X |
| 3,992,825 | 11/1976 | May | 52/389 X |

*Primary Examiner*—Price C. Faw, Jr.
*Assistant Examiner*—Carl D. Friedman
*Attorney, Agent, or Firm*—Geoffrey R. Myers

[57] ABSTRACT

A large area wall element of lightweight sandwich design for prefabricated buildings has a weatherproof outer layer which is formed by facing panels which are fixed to a foamed plastic layer by means of an adhesive layer in which fiberglass matting is embedded, the foamed plastic layer being glued to the supporting structure of the wall element. This wall element can be fabricated completely at the factory and transported from there to the construction site. It offers good thermal insulation and good weatherproofing. Through selection of the facing panels, a wide variety of effects can be achieved. In particular, facing panels of stone or stoneware, including brick, are suitable. The impressing of a masonry wall can be achieved by means of bricks. However the facing panels can also be arranged in distinct areas defined by means of wooden elements arranged in the form of framework. In this connection, the wooden elements can either be fixed directly to the supporting structure of the wall element or to the foamed plastic layer by means of the adhesive layer.

14 Claims, 5 Drawing Figures

LARGE AREA WALL ELEMENT OF LIGHTWEIGHT SANDWICH DESIGN FOR PREFABRICATED BUILDINGS

The present invention relates to a large area wall element of lightweight sandwich design for prefabricated buildings, having a weatherproof outer layer.

The owner often does not wish it to be readily recognizable from the outside that his house is a prefabricated building. For this reason, the wall elements of prefabricated buildings frequently have a weatherproof outer layer which is similar to the outer layer of a conventional building. If this weatherproof outer layer is to be applied at the factory, it has previously consisted exclusively of an artificial-resin stucco, as this type of stucco can be applied relatively thinly so that it thus has a low weight per square foot and therefore adheres sufficiently well to the outside of the wall element.

However in many cases an artifical resin stucco layer of this nature is not viewed as being sufficient for producing the impression of a conventional building. In these cases, the building is surrounded by means of a brick wall, which is separate from the wall elements and arranged in front thereof, at the construction site after the building has been erected. The construction of a brick wall of this type is undoubtedly very expensive, and also consumes a considerable length of time, thereby eliminating significant advantages of the prefabricated building. This also results in considerable difficulties with respect to window and door connections, which must connect the brick wall in front of the wall elements with the wall elements of the prefabricated building.

It is the object of the present invention to design a large area wall element for prefabricated buildings in such a manner as to both produce the impression of a conventional building and achieve the same weatherproofing characteristics possible with a conventional wall, which avoiding the difficulties which previously resulted from placing a separate wall in front of the wall element of the prefabricated building. On the contrary, it should be possible to prefabricate large area wall elements of lightweight sandwich design, i.e. of wooden design, for prefabricated buildings, which normally extend the entire height of the story and whose length is usually equal to the entire length of the building, to the extent that this is not prevented by transportation limitations, in the factory and to transport them to the construction site; in this connection, they should be designed in such a manner as to achieve the impression and weatherproofing characteristics of a conventional, solid wall.

According to the present invention, this object is solved in that the weatherproof outer layer of the wall element is formed by facing panels which are fixed to a foamed plastic layer by means of an adhesive layer in which fiberglass matting is embedded, the foamed plastic layer being glued to the supporting structure of the wall element.

It has surprisingly been found that the above described design can provide a permanent connection between facing panels and the supporting structure of a wall element for prefabricated buildings, which remains free of cracking for long periods of time, thereby ensuring proper protection of the wall element. A wall element sheathed in this manner offers the appearance of a conventional, solid masonry wall, especially if the facing panels are of brick design. However the employment of other facing panels, especially facing panels of stone or stoneware, also produces the desired weatherproofing characteristics and the desired appearance of the wall. Since the facing panels can be glued on at the factory, there is no need for any additional work at the construction site, nor are there any difficulties with respect to a connection between the wall element and a brick wall in front of it.

In addition to brick, especially in the form of quarter bricks, the facing panels of stone or stoneware can also consist of natural stone slabs and tiles, as well as of artificial stone slabs and artificial-resin-bonded slabs of the type employed in the construction industry for such purposes. Additional architectural possibilities, in particular matching the prefabricated building to the landscape, are available to the owner if the facing panels are arranged in distinct areas defined by wooden elements arranged in the form of framework. Thus, this version of the present invention permits large area wall elements for prefabricated buildings to be created which lend the prefabricated building the appearance of a framework building. This offers the possibility of also being able to construct prefabricated buildings in territories in which framework architecture may possibly be prescribed, or at least desirable, for historical reasons.

Moreover, a framework facade offers highly varied architectural possibilities, which cannot be achieved in the case of uniform facades. In this connection, it is then also possible to employ wooden sheathing in at least several of the areas defined by the framework in place of bricks or other facing panels of stone or stoneware, e.g. beneath the windows. In addition, it is, of course, also possible to apply stucco in at least several areas defined by the framework, so that in this case one-piece facing panels, consisting of stucco on substrate, are arranged in the areas defined by the framework.

In an embodiment of the present invention, the wooden elements are fixed directly to the supporting structure of the wall element; i.e. they interrupt the foamed plastic layer glued to the supporting structure of the wall element. This measure is especially practical if solid wooden elements having the rough hewn surface of a beam are to be employed. However instead of this, it is also possible to fix the wooden elements to the foamed plastic layer by means of the adhesive layer. This arrangement provides the advantage that the outer insulating layer formed by the foamed plastic layer and the adhesive layer covers the entire wall element without interruption. In this case, it is practical to employ bonded, multiple-ply panels for the wooden elements.

In the case of the first embodiment, in particular, in which the wooden elements are fixed directly to the supporting structure of the wall element, it is practical to point the gaps between the facing panels and the wooden elements with a permanently elastic sealing compound.

Known prefabricated buildings with a brick wall arranged in front of the wall element provide the particular advantage of an insulating layer of air between the brick wall and the wall element of a prefabricated building. However at least the same insulating effect is achieved with the wall element according to the present invention as a result of the foamed plastic layer between the adhesive layer and the supporting structure. A foamed plastic layer of this nature offers a high degree of thermal and noise insulation, whereby it is of particular advantage that this insulation is located on the outer side of the wall element, thereby protecting the supporting structure of the wall element against great changes in temperature. In this connection, the foamed plastic layer, which can preferably consist of foamed polystyrene, can assume tensions which result from the different working of the outer layer, formed by the facing panels, and the supporting structure of the wall elements. The formation of cracks in the adhesive layer, preferably consisting of a polyurethane adhesive, especially in the area of the joint gaps between facing panels, is effectively prevented by means of the fiberglass matting embedded in the adhesive layer, which assumes the tensions exerted on the adhesive layer.

In the case of large area wall elements of this type, the danger of their being damaged during transportation or erection is a particular problem. While it is readily possible to dimension the strength of the foamed plastic layer in such a manner that it bears the relatively high weight of the facing panels, transportation and, in particular, erection of the wall elements results in blow stresses which can amount to many times the static load to which the foamed plastic layer is subjected by the weight of the outer layer. In order to be able to assume such forces, in a preferred embodiment of the invention the fiberglass matting is rigidly and directly connected with the supporting structure at the upper edge of the wall element so that forces of this nature are assumed directly by the fiberglass matting embedded in the adhesive layer and are therefore kept away from the foamed plastic layer. This measure makes it unnecessary to treat the wall elements for prefabricated buildings according to the present invention with greater care when erecting the prefabricated building than is the case with known, large-area wall elements.

It is especially practical to provide the connection between the fiberglass matting and the supporting structure by wrapping the upper edge of the fiberglass matting about a strip and fixing the strip to the supporting structure above the foamed plastic layer. This permits a connection to be provided, in a simple manner, between the fiberglass matting and the supporting structure which makes full utilisation of the strength of the fiberglass matting.

The gaps between facing plates are preferably filled with a pointing compound which has a small maximum particle size, cures only slowly and is both water repellent and permeable to water vapor. This can be a commercial pointing compound which is mixed in the above-mentioned manner; this means that a pointing compound can be selected from the commercially available compounds which is most similar to the above-mentioned requirements. In this connection, a small maximum particle size ensures the formation of a smooth, crack-free surface which will also not be damaged by the movements of the large area wall elements during transportation and erection, as the pointing compound still retains a certain degree of elasticity during these operations as a result of its slow curing properties.

The above discussed and other objects, features and advantages of the present invention will become more apparent from the following description of the practical example shown in the drawings, in which FIG. 1 shows an elevation of a first embodiment of a large area wall element according to the present invention;

Figure 1:
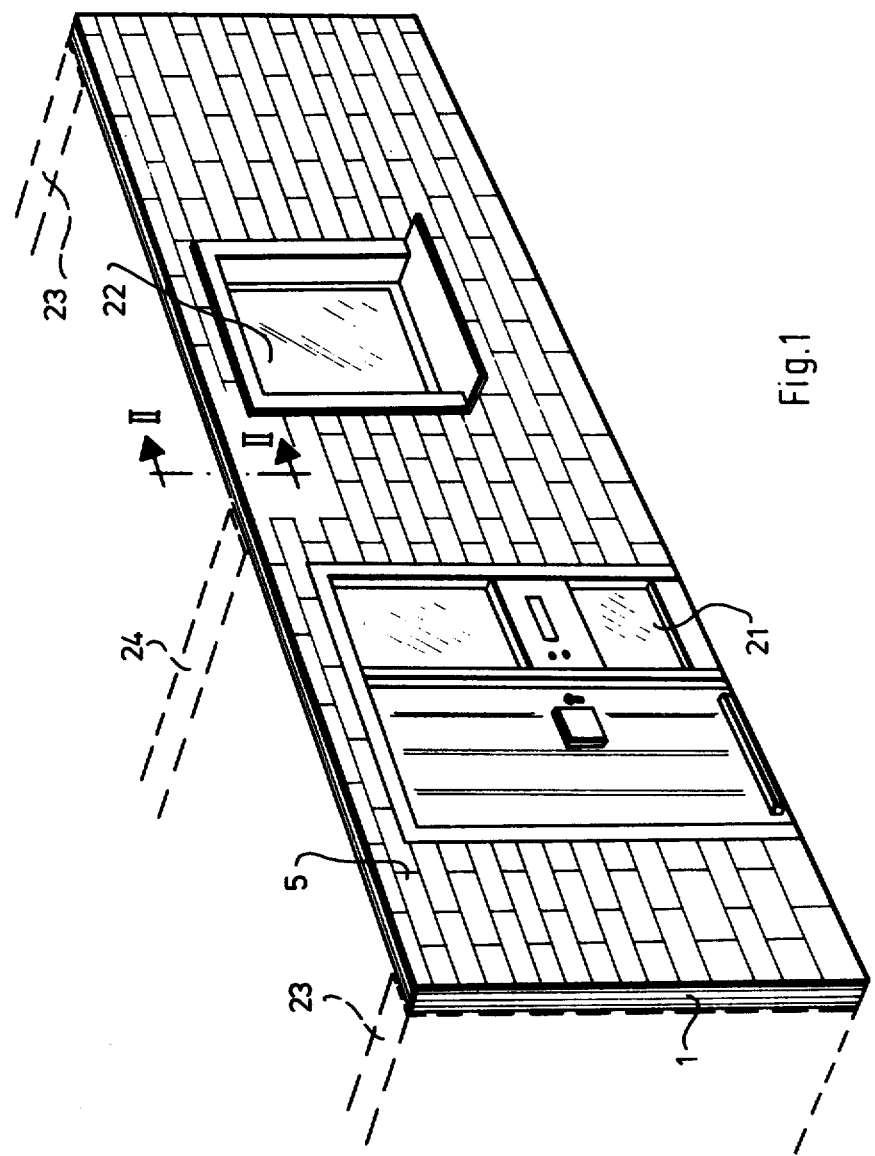
Figure 2:
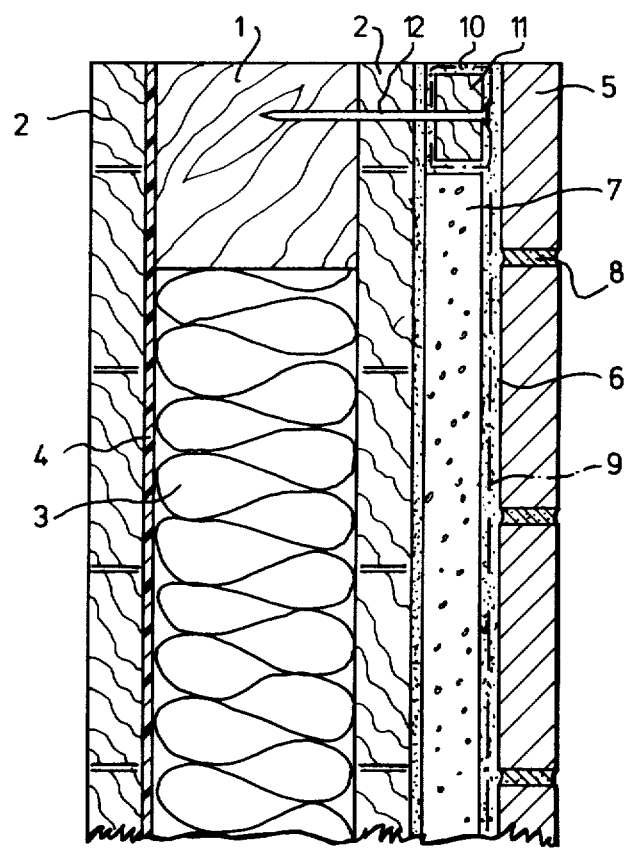
FIG. 2 shows a section taken along line II—II through the upper edge of the wall element according to FIG. 1, with a larger scale.

Referring now to the drawings, wherein like reference numerals designate like parts throughout the several views, the wall element for prefabricated buildings shown in FIGS. 1 and 2 forms a complete building wall, with house door 21 and window 22, extending throughout the complete height of a story. House door 21 and window 22, as well as connections for additional outer walls 23 and inner walls 24, are integral components of the wall element, which is fabricated completely at the factory and is merely set up at the construction site. The maximum possible length of large area wall elements of this type is limited only by the maximum permissible transportation lengths allowed in accordance with traffic regulations. The illustrated wall element is of lightweight sandwich design, having a supporting frame 1 of wood, which is covered with wooden panels 2 on both sides. The space between wooden panels 2 is filled with a thermally insulating material 3, in particular glass or rock wool. A polyethylene film 4, serving as a vapor barrier, is arranged on that side of inner wood panel 2 facing frame 1.

The illustrated wall element has a weatherproof outer layer formed by facing panels 5 in the form of one-quarter bricks. Instead, facing panels of natural stone, artificial stone and tiles, as well as artificial-resin-bonded slabs could also be employed. Facing panels 5 are fixed to a foamed plastic layer 7 by means of an adhesive layer 6; foamed plastic layer 7, in turn, is glued to outer wooden panel 2 of the wall element. In the illustrated practical example, the adhesive layer consists of a polyurethane adhesive; however it is obvious that other suitable adhesives, especially epoxy resin adhesives, can also be employed. Similar adhesives can also be employed for fixing foamed plastic layer 7 to outer wooden panel 2. Foamed plastic layer 7 can, for example, consist of panels fabricated of foamed polystyrene. Here, also, other plastics can also be employed, in particular foamed polyurethane. The gaps 8 between facing panels 5 are pointed with pointing mortar. A commercial compound can be employed for this purpose; this compound can be mixed to cure only slowly, thereby still offering a certain degree of elasticity during transportation and erection of the wall element. This prevents cracking in the area of the gaps when the wall elements are moved. In addition, a pointing compound is selected which has a small maximum particle size, which is also favorable for forming a smooth, crack-free surface. And finally, while the pointing compound employed is water repellent in order to ensure the desired weatherproof characteristic, it is permeable to water vapor in order to permit the diffusion of water vapor, which is desired in terms of construction physics.

In the illustrated practical example, fiberglass matting 9 is embedded in adhesive layer 6; fiberglass matting 9 extends uninterrupted throughout the height of the wall, so that it not only strengthens adhesive layer 6, but can also assume the weight of the entire outer layer and transmit it to the supporting structure. For this purpose, the upper edge 10 of fiberglass matting 9 is wrapped about a wooden strip 11, which is fixed to the supporting structure, by means of nails 12 for example, above the upper edge of foamed plastic layer 7. Nails 12 penetrate through wooden panel 2 and extend into the beam of frame 1. As a result of this measure, plastic layer 7 is largely relieved of the weight of the facing panels, so that there is no danger of portions of the facing tearing away from the foamed plastic layer if the wall element is subjected to considerable blows when being erected.

Moreover, fiberglass matting 9 embedded in adhesive layer 6 prevents the formation of cracks in the adhesive layer, so that the wall element is even protected by an enclosed outer layer, which is entirely free of cracks, if the outer layer and the supporting structure of the wall element are subjected to different temperatures and even great changes in temperature as a result of the weather, which could result in significant tensions between the outer layer and the supporting structure. Tensions of this nature are assumed by foamed plastic layer 7, which permits relative movement between the outer layer and the supporting structure. Should cracks occur in the foamed plastic layer in this connection, these cracks do not have a negative influence, as they are covered by the undamaged adhesive layer, reinforced by the fiberglass matting, with the facing plates.

Figure 3:
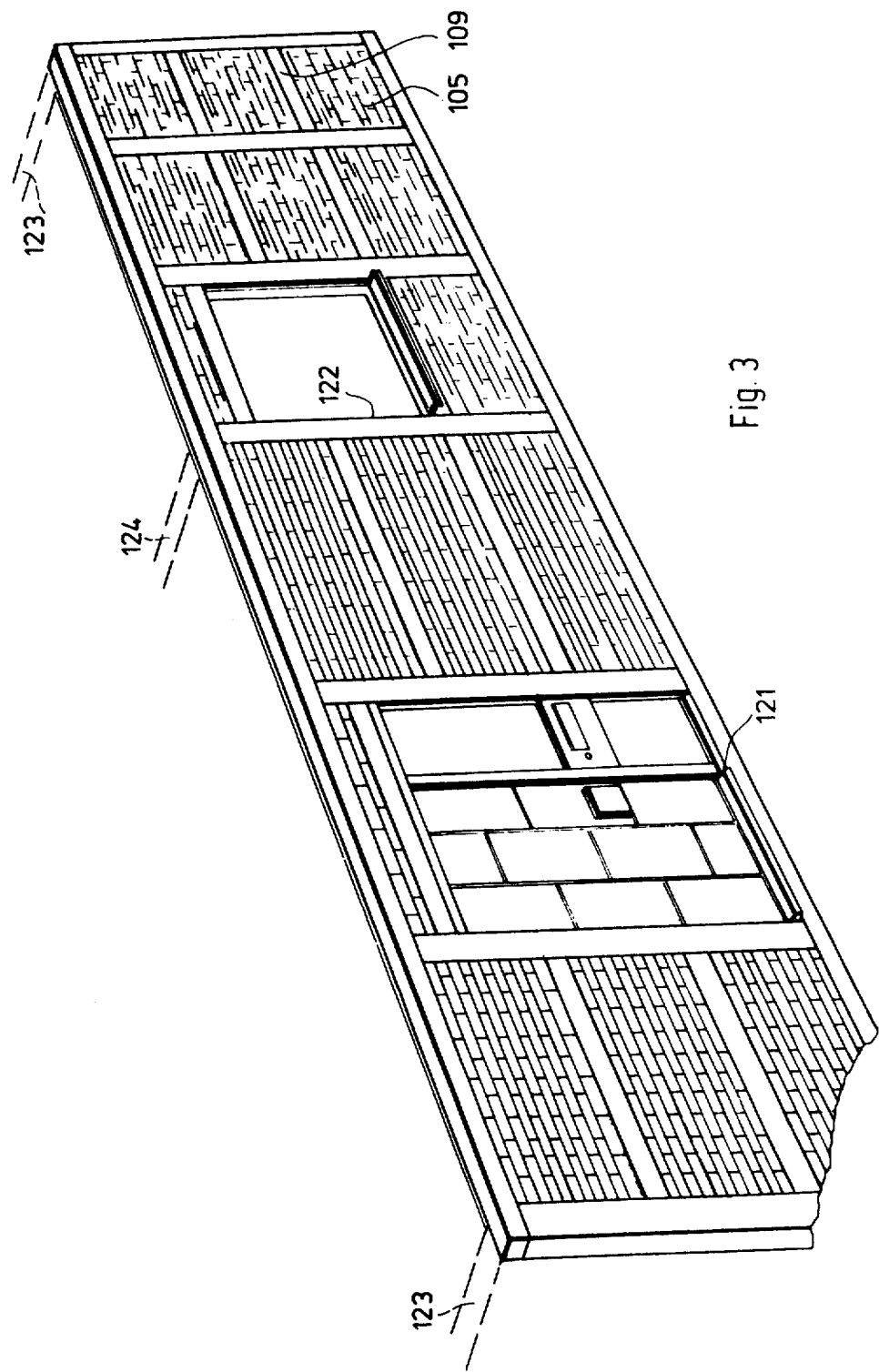
FIG. 3 shows an elevation of a second embodiment of a large area wall element according to the present invention.
Figure 4:
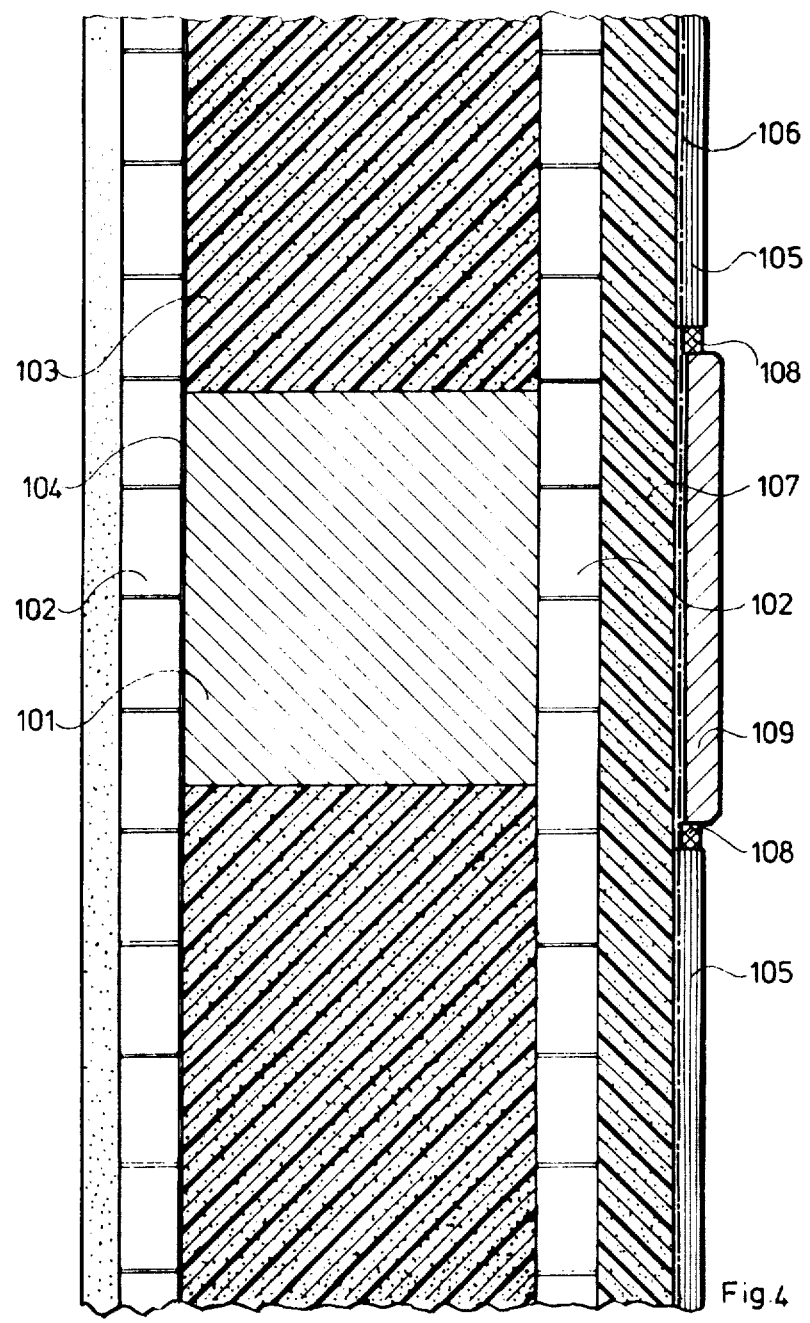
FIG. 4 shows a cross section taken through a section of the wall element according to FIG. 3, with a larger scale.

The wall element for prefabricated buildings shown in FIGS. 3 and 4 also forms a complete building wall, extending the height of a complete story and having a door 121 and window 122. Door 121, window 122, as well as connections for further outer walls 123 and inner walls 124 are integral components of the wall element, which is fabricated completely at the factory and merely set up at the construction site. Normally, the length of the wall corresponds to the length or width of the building. The wall element can also contain window combinations, building entrance elements, etc. The illustrated wall element is also of lightweight sandwich design, having a supporting frame 101 of wood, covered with wooden panels 102 on both sides. The space between wooden panels 102 is filled with a thermally insulating material 103, in particular glass or rock wool. A polyethylene film 104, serving as a vapor barrier, is arranged on that side of inner wooden panel 102 facing frame 101.

A foamed plastic layer 107 is glued to outer wooden panel 102 of the wall element. Panels of foamed polystyrene are presently preferred for foamed plastic layer 107, although other plastics can also be employed, in particular foamed polyurethane plastics. Facing panels 105 and 109 are glued to foamed plastic layer 107 by means of an adhesive layer 106, in which fiberglass matting is embedded. The adhesive layer preferably consists of a polyurethane adhesive, although other adhesives, in particular epoxy resin adhesives, can also be employed. Similar adhesives can also be employed for fixing foamed plastic layer 107 to outer wooden panel 102.

In the illustrated practical example, facing panels 105 consist of brick, while facing panels 109 are of wood, arranged in the form of framework; i.e. they form enclosed areas in which bricks 105 are arranged. Because they are not thick, wooden elements 109 consist of glued, multiple-ply panels which can readily withstand the effects of the weather. The gaps 108 between facing panels 105 and wooden elements 109 are pointed with a permanently elastic sealing compound.

Figure 5:
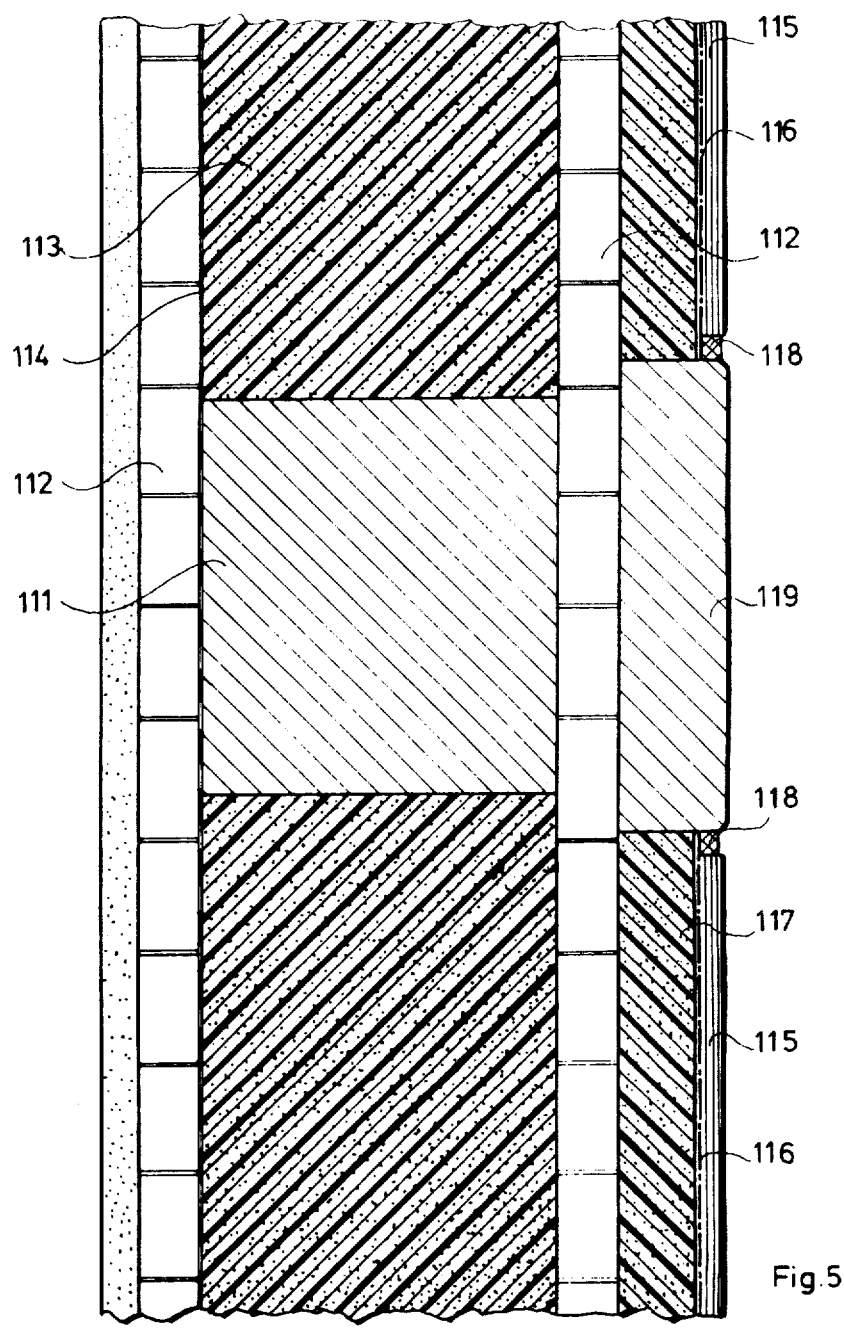
FIG. 5 shows a section, similar to that shown in FIG. 4, taken through a further embodiment of a wall element.

The wall element shown in FIG. 5 is of generally the same design as the wall element according to FIGS. 3 and 4. It also consists of a supporting frame 111 of wood, covered with wooden panels 112 on both sides. The space between wooden panels 112 is filled with a thermally insulating material 113. A polyethylene film 114, serving as a vapor barrier, is located on that side of inner wooden panel 112 facing frame 111. However in this case, in contrast to the above-described embodiment, the wooden elements 119 forming the framework are fixed directly to the outer side of outer wooden panel 112. In this case, wooden elements 119 can again be fixed by means of glue, nails or screws. In this case, solid wooden elements 119 can be employed without difficulty; in particular, the outer surface can be rough hewn, thereby providing the appearance of an old beam. Thus, in this case not only facing panels 115 are arranged in areas, but the foamed plastic layer 117, which is glued to outer wooden panel 112, is also divided into distinct areas. Foamed plastic layer 117, in turn, is covered with an adhesive layer 116, in which fiberglass matting is embedded and which supports facing panels 115. The gaps 118 between facing panels 115 and wooden elements 119 are also filled with a permanently elastic sealing compound. The employment of a permanently elastic sealing compound is especially important in this case in order to dependably prevent moisture from penetrating along the wooden components to and behind foamed plastic layer 117. On the other hand, this embodiment offers the advantage that the wooden elements, which are connected directly with the supporting structure of the wall element, assume the loads resulting from the facing and transmit them to the supporting structure; i.e. there is a uniform distribution of forces.

It is obvious that in the case of the wall element faced with a framework arrangement the areas defined by the wooden elements can be filled with any and all materials customarily employed with normal framework. In addition to bricks, this also includes, for example, wooden sheathing and stucco. Consequently, if desired, facing panels 115 can consist of wooden sheathing or of a substrate covered with stucco. It is obvious that in the case of a stucco and substrate design, panels need not be prefabricated and then glued on, but that the substrate and stucco layer can be applied directly to the areas between the wooden elements. This permits highly attractive effects to be achieved if areas of the same wall element are filled with different materials.

The present invention was described above on the basis of preferred practical examples. However it is obvious that the present invention is not limited to these practical examples but that many modifications and variations of the present invention are possible in the light of the above teachings. It should therefore be understood that within the scope of the appended claims, the invention may be practised otherwise than as specifically described.

Having thus fully disclosed my invention, what I claim is:

1. A load-bearing, transportable outer wall of a prefabricated building comprising a panel-like supporting member having an outer continuous surface, and at least four outer layers, said supporting structure and said layers arranged in a sandwich design, the outermost layer comprising at least two weatherproof facing panels, a panel-like layer of foamed plastic, a first adhesive layer located between and adhering the outermost layer to the foamed plastic layer, and a continuous fiberglass matting embedded in said first adhesive layer, such that said matting is located within said first adhesive layer, said foamed plastic layer having its innermost surface glued to the outer continuous surface of the panel-like supporting member by a second adhesive layer, and its outermost surface joined to said continuous fiberglass matting by said first adhesive layer, thereby to locate said foamed plastic layer between said supporting member and said matting.

2. The wall element according to claim 1, in which the foamed plastic layer consists of foamed polystyrene.

3. The wall element according to claim 2, in which the upper edge of the fiberglass matting is directly and rigidly connected with the supporting structure.

4. The wall element according to claim 3, in which the upper edge of the fiberglass matting is wrapped around a strip and the strip is fixed to the supporting structure above the foamed plastic layer.

5. The wall element according to claim 1, in which the adhesive layer consists of a polyurethane resin.

6. The wall element according to claim 1, in which the facing panels are arranged in distinct areas, separated by wooden elements arranged in the form of framework.

7. The wall element according to claim 6, in which the wooden elements are fixed directly to the supporting structure of the wall element.

8. The wall element according to claim 6, in which the wooden elements are fixed to the foamed plastic layer by means of the adhesive layer.

9. The wall element according to claim 8, in which the wooden elements consist of bonded, multiple-ply panels.

10. The wall element according to claim 9, in which the gaps between the facing panels and the wooden elements are pointed with a permanently elastic sealing compound.

11. The wall element according to claim 1, in which at least a portion of the facing panels are of stone or stoneware.

12. The wall element according to claim 1, in which at least a portion of the facing panels consist of wooden sheathing.

13. The wall element according to claim 1, in which at least a portion of the facing panels consist of a substrate covered with a stucco.

14. The wall element according to claim 1, in which the gaps between the facing panels are pointed with a pointing compound which has a small maximum particle size, cures only slowly and is both water repellent and permeable to water vapor.

* * * * *